No. 761,140. PATENTED MAY 31, 1904.
N. BOWDITCH.
COTTON HARVESTER.
APPLICATION FILED APR. 22, 1901.
NO MODEL. 5 SHEETS—SHEET 1.
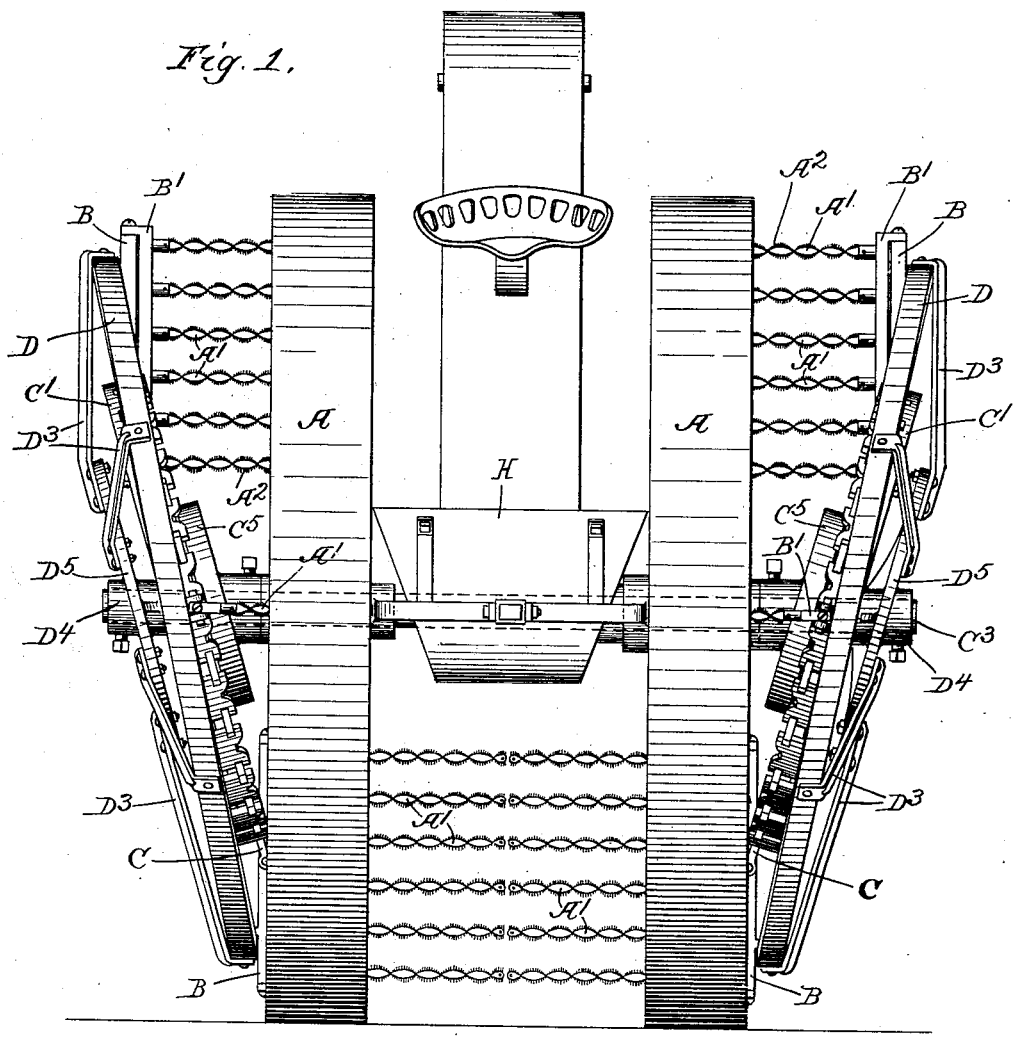
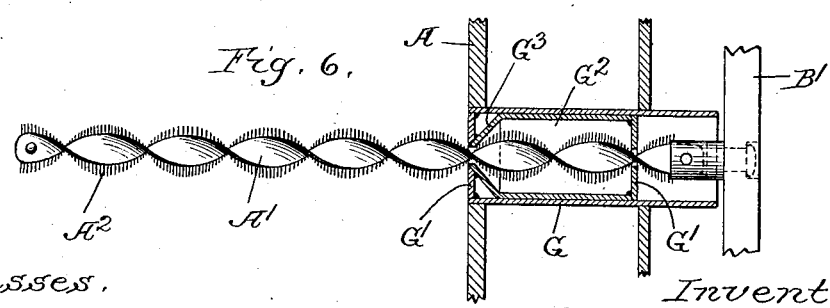
Witnesses.
Edward T. Wray.
Fanny B. Fay.
Inventor.
Nathaniel Bowditch
by Parker & Carter
his Atty's.

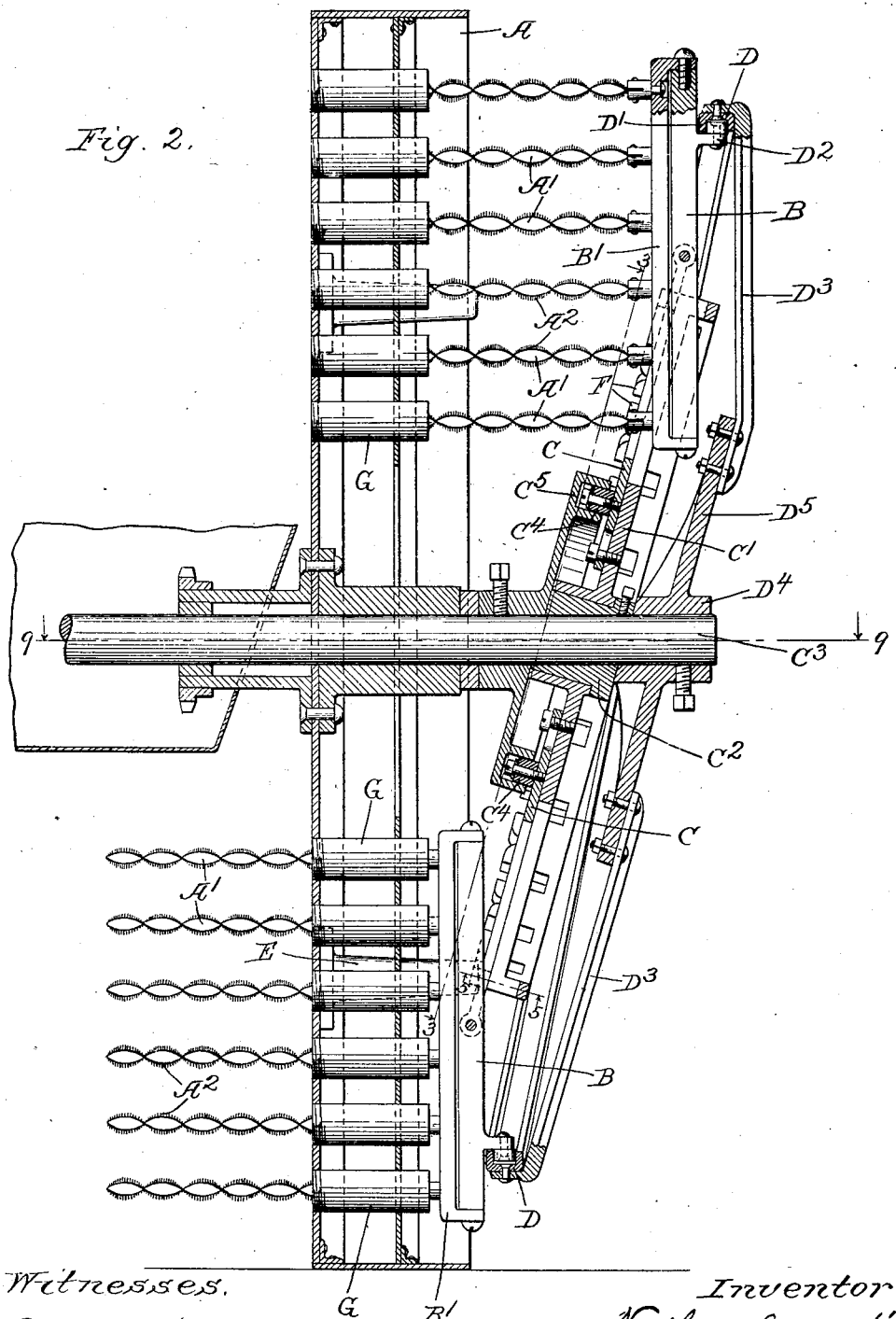

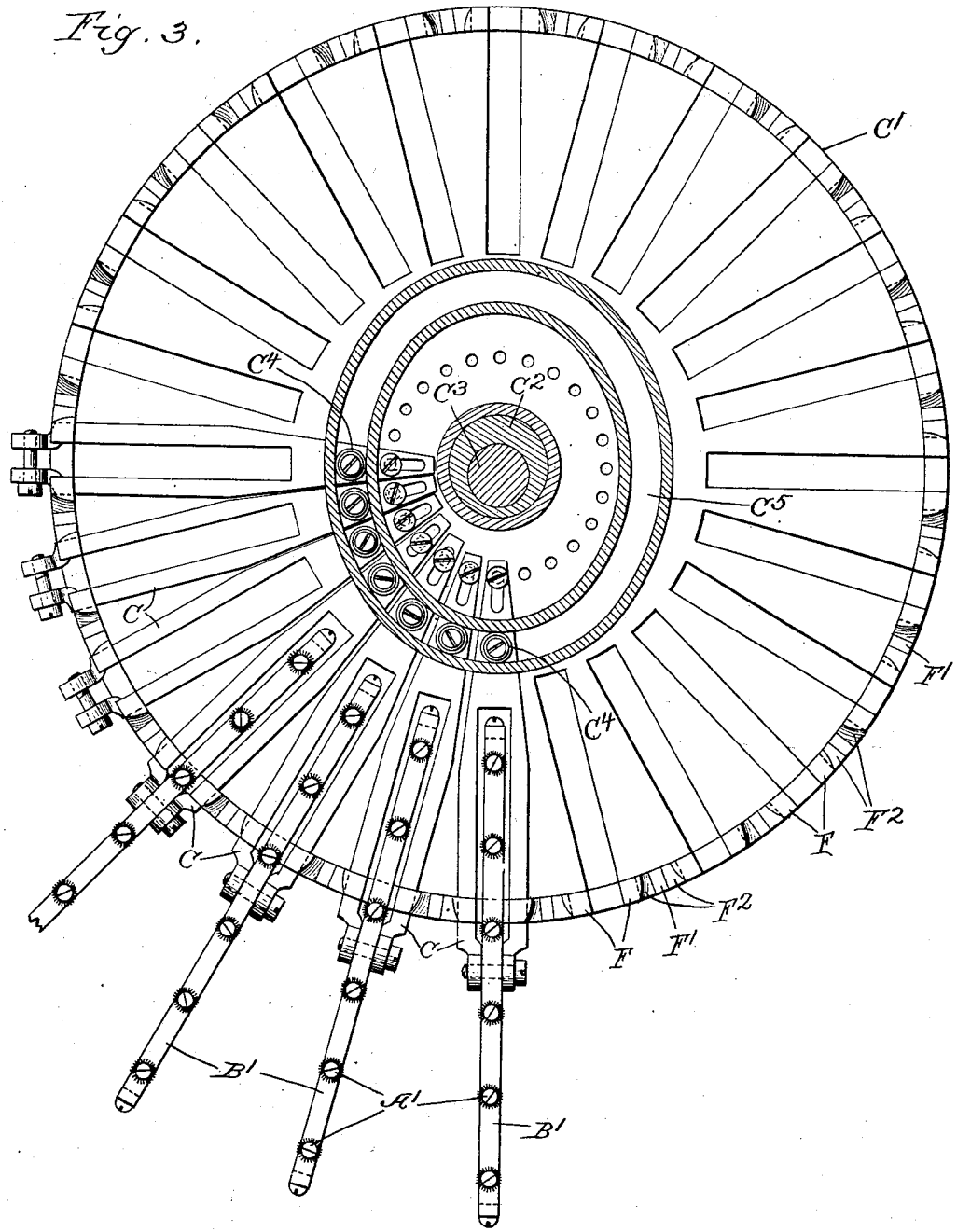

No. 761,140. PATENTED MAY 31, 1904.
N. BOWDITCH.
COTTON HARVESTER.
APPLICATION FILED APR. 22, 1901.
NO MODEL. 5 SHEETS—SHEET 4.

Witnesses.
Edward T. Wray.
Fanny B. Fay.

Inventor.
Nathaniel Bowditch
by Parker & Carter
his Atty's.

No. 761,140. PATENTED MAY 31, 1904.
N. BOWDITCH.
COTTON HARVESTER.
APPLICATION FILED APR. 22, 1901.
NO MODEL. 5 SHEETS—SHEET 5.

Witnesses,
Edward T. Wray
Fanny B. Gay

Inventor
Nathaniel Bowditch
by Parker & Carter
his Atty's.

No. 761,140.   Patented May 31, 1904.

UNITED STATES PATENT OFFICE.

NATHANIEL BOWDITCH, OF AURORA, ILLINOIS.

COTTON-HARVESTER.

SPECIFICATION forming part of Letters Patent No. 761,140, dated May 31, 1904.

Application filed April 22, 1901. Serial No. 56,961. (No model.)

*To all whom it may concern:*

Be it known that I, NATHANIEL BOWDITCH, a citizen of the United States, residing at Aurora, in the county of Kane and State of Illinois, have invented a certain new and useful Improvement in Cotton-Harvesters, of which the following is a specification.

My invention relates to cotton-harvesting machines, and has for its object to provide a new and improved machine for picking cotton and the like.

My invention is illustrated in the accompanying drawings, wherein—

Figure 4:
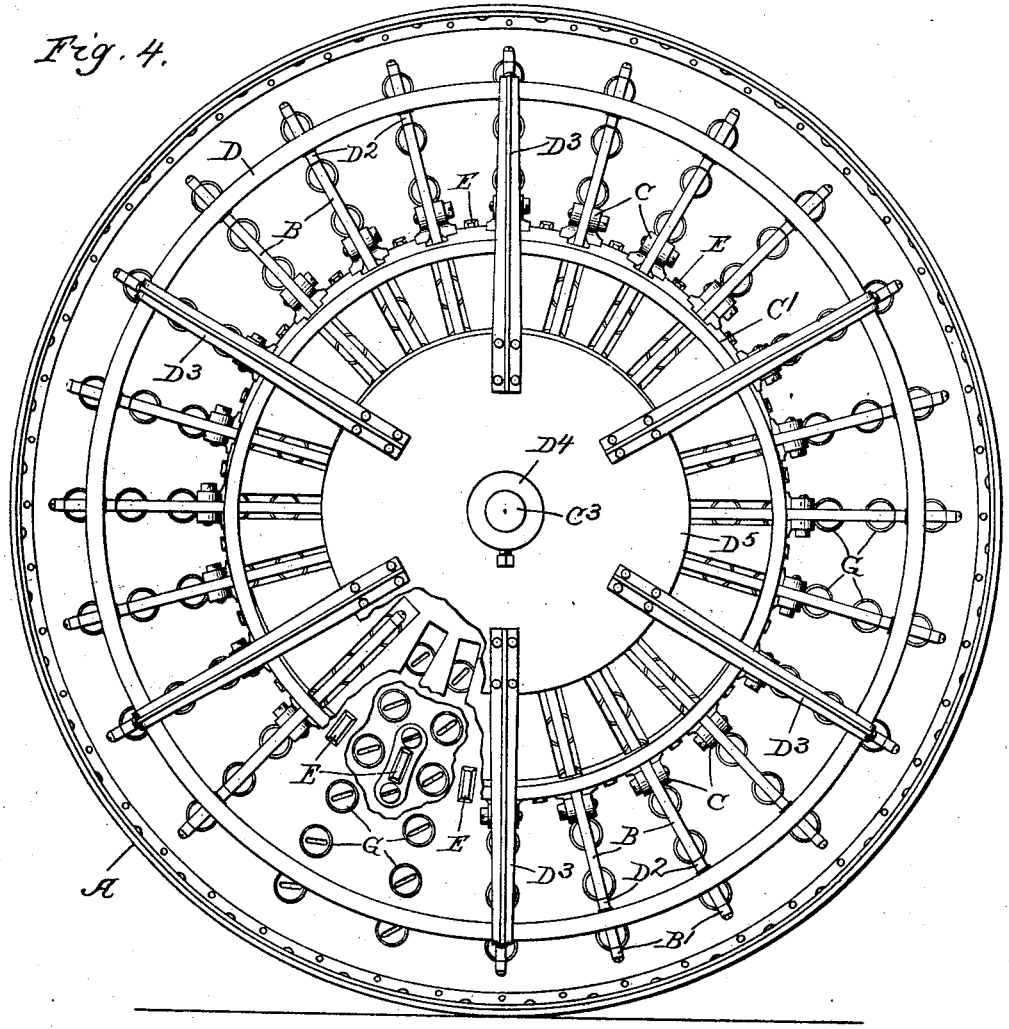
Figure 5:
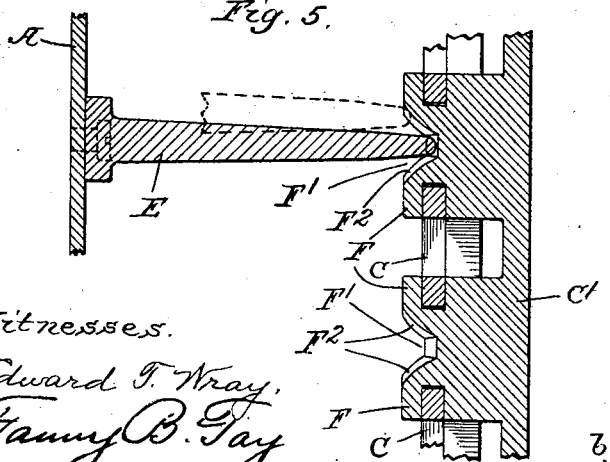
Figure 8:
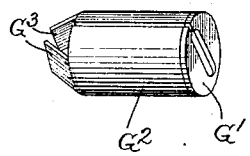
Figure 7:
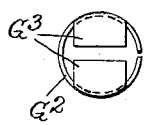
Figure 9:
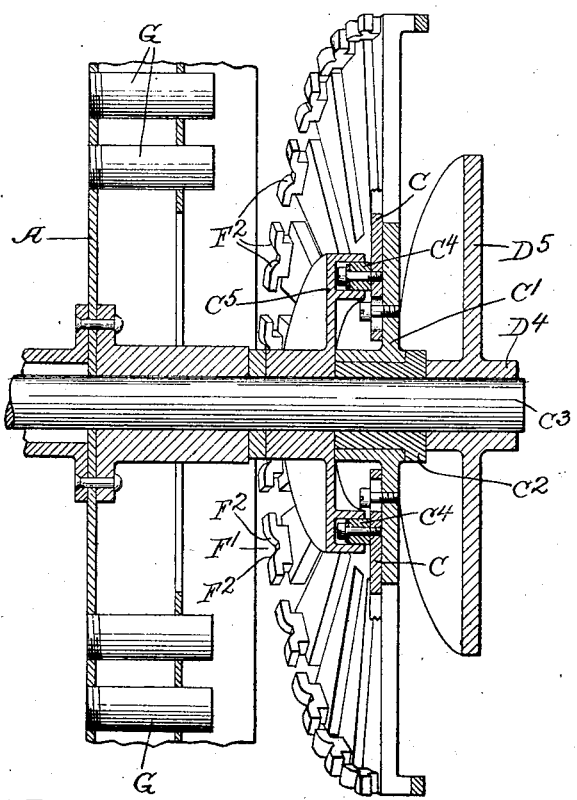
Figure 10:
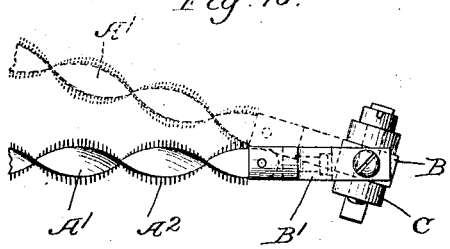
Figure 11:
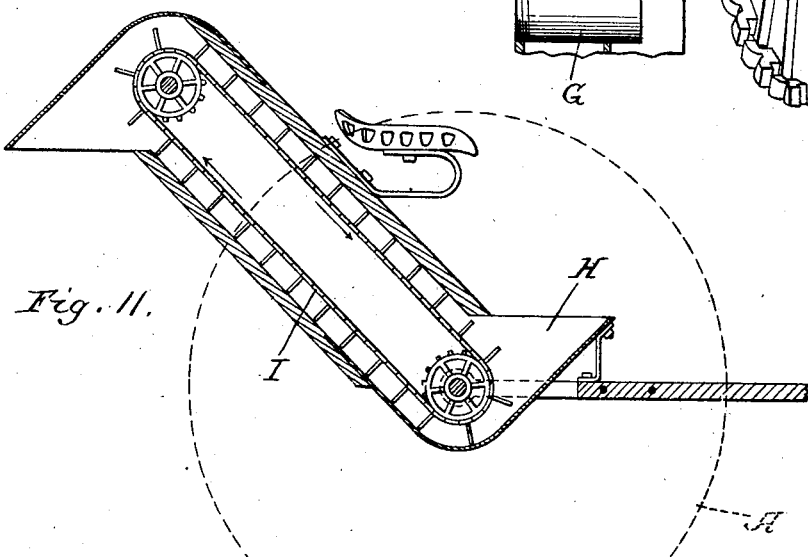

Figure 1 is a front elevation of a device embodying my invention. Fig. 2 is a vertical section through one of the wheels. Fig. 3 is an enlarged sectional view on line 3 3, Fig. 2. Fig. 4 is an exterior face view with parts broken away of one of the wheels. Fig. 5 is an enlarged sectional view on line 5 5, Fig. 2. Fig. 6 is an enlarged sectional view through one of the cotton-pickers and the guiding device or tubes through which it passes. Fig. 7 is an end view of the inner tube through which the cotton-picker passes. Fig. 8 is a perspective view of the device shown in Fig. 7. Fig. 9 is a sectional view with parts omitted on line 9 9, Fig. 2. Fig. 10 is an end view of one of the bars carrying the pickers when in a horizontal position. Fig. 11 is a view showing the elevator.

Like letters refer to like parts throughout the several figures.

As herein illustrated, I provide a machine mounted upon suitable supporting-wheels, which have a series of cotton-pickers directly associated therewith. This machine is so constructed that it may be moved along a row of cotton-plants, so that the pickers will engage the cotton and remove it from the plants. The supporting-wheels A are provided with openings through which pass the picking-spindles A', which engage the cotton. These spindles may be made in any desired manner, and, as herein shown, consist of two pieces of flat metal between which is interposed a piece of haircloth or other suitable material. The whole is twisted to form a spiral, the edges of the haircloth projecting beyond the metal and wheels, the cloth forming the picking-points $A^2$. The pickers are rotatably connected to the bars B, and some means is provided for moving these bars back and forth in a direction substantially parallel to the axle $C^3$ of the machine, so that the pickers will be projected in between the wheels to engage the cotton-plant at the lower part of the wheels and be withdrawn therefrom at the upper part of the wheels to wipe off the picked cotton. The bars B are pivotally connected near their middle with the picker-supports C, which are connected with the inclined wheel C', which is rotatably mounted upon the inclined bushing $C^2$, attached to the axle $C^3$. This inclined wheel therefore rotates about the axle in a plane having a fixed inclination with relation to said axle and the supporting-wheel, thus insuring a proper reciprocation of the pickers. As the bars B are pivotally connected to the picker-supports C, it is desirable to have some suitable guiding or retaining device which will engage the bars so as to prevent them from unduly tilting should the cotton be unevenly distributed along the pickers associated therewith. If, for example, more cotton should be attached to one of the end pickers than any of the others, it would be harder to withdraw the end picker, and hence there would be a tendency for the bars to tilt, and thus throw the parts out of alinement. I provide a suitable guiding or retaining device to prevent this difficulty and to insure the parallelism of the bars in all their various positions. This guiding or retaining device may be of any desired description and, as herein shown, consists of an engaging part D, preferably held against rotation and which engages the bars B as they pass around the axle. This engaging device is inclined to correspond with the inclination of the inclined wheel C' and is so arranged that all of its various parts are properly located to correspond with the varied positions of the bars B during their rotation. As herein illustrated, the engaging part D is provided with an edge D', which engages an engaging portion $D^2$ on each of said bars B. The engaging part D is held in position by means of the supports D³, attached to the hub D⁴, fixed to the axle C³. This hub is preferably provided with a web D⁵, to which the supports are fastened.

The inclination of the inclined wheel C' introduces certain irregularities in the machine for which suitable compensating devices are required. This will be seen when we note that the projection of the periphery of the inclined wheel upon the supporting-wheel is not a circle, but an ellipse, and hence the compensating devices must be arranged to continually act upon the ends of the pickers associated with the inclined wheel, so as to correct this elliptical shape as the pickers rotate about the axle. This result is performed in the construction shown by having the picker-supports C movable and connecting them with the inclined wheel, so that they can reciprocate. These picker-supports work in suitable guides on the inclined wheel and are provided with engaging parts C⁴, which work in a guide C⁵ or other suitable engaging device which does not rotate, but which is shaped so as to move the picker-supports in and out to correct for the inclination of the wheel. By this arrangement the pickers are always held perpendicular to the supporting-wheel and there is no bending out of line, as would be the case if the compensating devices were not used.

The inclination of the wheel C' produces another irregularity which tends to pull the pickers out of line and prevent their operation. When the bar B is in its vertical position—say at the top of the wheel C'—the pickers will be perpendicular to the wheel A. As this bar is now moving toward the horizontal position there is a twist given it which twists the pickers out of line. This twist is at a maximum in the horizontal position. By referring to Figs. 1 and 10 this feature will be readily understood. If the pickers are connected directly to the bars B, it will be seen that when the bars reach the horizontal position the pickers will project at substantially right angles from the face of the wheel C', as shown in dotted lines in Fig. 10, and hence would not be perpendicular to the face of the wheel A. This defect is remedied by connecting the ends of the pickers with the compensating bars B', which are pivotally connected with the bars B, so that they can swing around to compensate for this twisting movement. The inclined wheel C' is rotated in unison with the wheel A by the teeth E, which engage it at the point nearest the wheel A that is below the axle.

A compensating arrangement must be provided because of the inclination of the wheel C'. As herein shown, the wheel C' is provided with teeth F, having an enlarged space F' between them, the faces F² of the teeth being inclined. The teeth E first engage the inclined faces F², as shown in dotted lines, Fig. 5, and then slide down into the space, as shown in full lines. This arrangement insures the proper rotation of the inclined wheel.

The wheels A are provided with suitable guides for the pickers A'. (See Fig. 6.) These guides may be of any suitable description. As herein shown, they consist of the tubes G, having one or more disks G', which are slotted, the spiral pickers passing through these slots. The reciprocation of these pickers through these slots causes them to rotate. As shown in this figure, I have provided an internal tube G², which has the inclined ends G³, which insure the picker passing through the end slot when it is withdrawn through said end slot to wipe off the cotton. This tube is shown in Figs. 7 and 8. Between the wheels A, I prefer to provide a suitable receptacle H, into which the cotton falls, and an elevator I operatively connected with one of the wheels A, which moves the picked cotton to a discharge-point, where it is discharged into a sack or other device.

I have described in detail a particular construction embodying my invention; but it is of course evident that the parts may be varied in many particulars and some of the parts be omitted and others used with parts not herein shown without departing from the spirit of my invention, and I therefore do not limit myself to the construction shown.

The use and operation of my invention are as follows: When the machine is drawn along a row of cotton-plants, so that the plants pass between the wheels A, the pickers are projected into the plants at the bottom and are rotated about their axes. The picking-points then engage the cotton and remove it from the plants. As the wheels rotate the inclined wheels cause the pickers to be withdrawn through the guides at or near the top of the wheel, and the cotton comes in contact with the face of the wheel and is wiped off, dropping into a receptacle. The elevator then carries it to the delivery-point. The guiding or retaining device keeps the bars B in a position substantially parallel to the face of the wheel A at all times and prevents any tendency to tilt, due to the uneven distribution of the cotton on the pickers. Since the cotton is not uniformly distributed on the cotton-plants, it will be seen that there is no way of securing uniformity of cotton on each of the pickers, and hence in practice it is found that the unequal distribution on the pickers on each side of the pivotal point of the bar to which they are attached causes an unbalanced condition which must be remedied, and the remedy must be such as to permit the effective working and operation of the other parts. The compensating devices keep the pickers in proper alinement, so that they may be properly projected through the wheel A, and the compensating devices keep the bars B in proper position, so as to be acted upon by the guiding or retaining device at all times.

The wheel with which the inclined wheel is associated may be termed a "picker-wheel," although any other suitable designation may be given.

I claim—

1. A cotton-harvester, comprising two wheels, one inclined with relation to the other, a series of bars pivotally connected to said inclined wheel, a series of cotton-pickers connected with each of said bars and projecting through the other wheel, and a guiding or retaining device for regulating the pivotal movement of said bars about their pivotal connection with the inclined wheel.

2. A cotton-harvesting machine, comprising a wheel, a series of guides carried thereby, a series of rotatable cotton-pickers working in said guides, an inclined wheel carrying a series of picker-supporting devices, said picker-supporting devices movably connected with the inclined wheel, so as to be given a radial movement as the wheel is rotated, a bar connected with each of said picker-supporting devices, each having a series of pickers rotatably attached to it, and a guiding or retaining device for controlling the pivotal movement of said bars.

3. A cotton-harvesting machine, comprising a supporting-wheel, a series of guides carried thereby, a series of cotton-pickers working in said guides, an inclined wheel carrying a series of picker-supporting devices, a series of bars connecting the picker-supporting devices and the pickers, a guiding or retaining device associated with said bars, and means for overcoming the eccentricities due to the inclination of said wheel, so as to keep the bars and the guiding or retaining device in proper relation to each other.

4. A cotton-harvesting machine, comprising a supporting-wheel provided with a series of guides, a series of spiral rotatable cotton-pickers mounted in said guides, an inclined wheel rotatably mounted upon the same axle as the supporting-wheel and carrying a series of bars, each having a series of pickers rotatably connected therewith, means for moving said bars with relation to the periphery of said inclined wheel, and a guiding or retaining device engaging the bars so as to keep them in alinement.

5. A cotton-harvesting machine, comprising a supporting-wheel provided with a series of guides, a series of spiral rotatable cotton-pickers working in said guides, an inclined wheel having a series of cotton-picker-supporting devices connected therewith, means for moving said cotton-picker-supporting devices radially, a bar pivotally connected with each of said cotton-picker-supporting devices, each bar having a series of pickers rotatably connected therewith, a non-rotating engaging part which engages an engaging portion on each of said bars, the parts arranged so that the radial movement of the picker-supporting devices insures the proper engagement between the engaging part and the bars.

6. A cotton-harvester, comprising two wheels, one inclined with relation to the other, a series of picker-supports connected with the inclined wheel, a series of pickers connected thereto and passing through the other wheel and a guiding or retaining device for holding said picker-supports in proper position.

7. A cotton-harvester comprising a series of bars, a series of pickers connected to said bars, a wheel having guides through which said pickers pass, means for moving said bars toward and from said wheel, and a guiding or retaining device for holding said bars substantially parallel with the face of said wheel as they are moved toward and from it.

NATHANIEL BOWDITCH.

Witnesses:
  DONALD M. CARTER,
  FANNY B. FAY.